United States Patent
Wu et al.

(10) Patent No.: US 11,353,541 B2
(45) Date of Patent: Jun. 7, 2022

(54) LOCALIZING A TARGET DEVICE BASED ON MEASUREMENTS FROM A MEASUREMENT DEVICE ARRAY

(71) Applicant: Zhejiang University, Hangzhou (CN)

(72) Inventors: Junfeng Wu, Hangzhou (CN); Jiming Chen, Hangzhou (CN); Jieqiang Wei, Täby (SE); Guangyang Zeng, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/283,400

(22) PCT Filed: Jun. 3, 2020

(86) PCT No.: PCT/CN2020/094219
§ 371 (c)(1),
(2) Date: Apr. 7, 2021

(87) PCT Pub. No.: WO2021/243609
PCT Pub. Date: Dec. 9, 2021

(65) Prior Publication Data
US 2021/0382134 A1   Dec. 9, 2021

(51) Int. Cl.
*G01S 5/06* (2006.01)
*H04W 64/00* (2009.01)

(52) U.S. Cl.
CPC ............. *G01S 5/06* (2013.01); *H04W 64/00* (2013.01)

(58) Field of Classification Search
CPC .................................... G01S 5/06; G01S 5/10
See application file for complete search history.

(56) References Cited

U.S. PATENT DOCUMENTS

2005/0035897 A1   2/2005   Perl et al.
2006/0273960 A1   12/2006  Murphy et al.
(Continued)

FOREIGN PATENT DOCUMENTS

| CN | 105764138 | 7/2016 |
| CN | 106054134 | 10/2016 |
| CN | 11063255 | 12/2019 |

OTHER PUBLICATIONS

"Positive definite." In The Penguin Dictionary of Mathematics, edited by David Nelson. 4th ed. Penguin, https://search.credoreference.com/content/entry/penguinmath/positive_definite/0, 2008 (Year: 2008).*

(Continued)

*Primary Examiner* — Bernarr E Gregory
*Assistant Examiner* — Fred H Mull
(74) *Attorney, Agent, or Firm* — Henry Patent Law Firm PLLC

(57) ABSTRACT

In a general aspect, a target is localized based on measurements from a measurement device array. In some aspects, range difference values ($d_i$) and coordinate vectors ($a_j$) of devices in the measurement device array are obtained. The range difference values are generated based on time difference of arrival measurements of wireless signals between the target device and each of the devices in the measurement device array. A first matrix (A) and a first vector (b) are constructed. The first matrix (A) and the first vector (b) each includes the range difference values and the coordinate vectors. Whether a second vector (y) satisfies a condition set is determined. The condition set includes a first condition $(A^T A + \lambda D)y = A^T b$ and a second condition $v^T (A^T A + \lambda D)v \geq 0$. A numerical approximation of an optimal solution of the second vector is generated. The target device is localized according to the numerical approximation of the optimal solution.

16 Claims, 7 Drawing Sheets

(56) References Cited

U.S. PATENT DOCUMENTS

| | | |
|---|---|---|
| 2007/0205944 A1 | 9/2007 | Lyons |
| 2008/0037512 A1 | 2/2008 | Aljadeff et al. |
| 2008/0186231 A1 | 8/2008 | Aljadeff et al. |
| 2014/0062791 A1 | 3/2014 | Lim et al. |
| 2018/0059211 A1 | 3/2018 | Furman et al. |
| 2019/0182629 A1 | 6/2019 | Priyanto et al. |

OTHER PUBLICATIONS

"Least squares." In Collins English Dictionary, edited by Collins Dictionaries. 12th ed. Collins, https://search.credoreference.com/content/entry/hcengdict/least_squares/0, 2014 (Year: 2014).*

E.W. Weisstein, "Positive Definite Matrix." From MathWorld—A Wolfram Web Resource, http://mathworld.wolfram.com/PositiveDefiniteMatrix.html, Mar. 2019 (Year: 2019).*

WIPO, International Search Report and Written Opinion dated Feb. 25, 2021, in PCT/CN2020/094219, 9 pgs.

Beck, et al., "Exact and Approximate Solutions of Source Localization Problems", IEEE Transactions on Signal Processing, vol. 56, No. 5, May 2008, 9 pgs.

Chan, et al., "A Simple and Efficient Estimator for Hyperbolic Location", IEEE Transactions on Signal Processing, vol. 42, No. 8, Aug. 1994, 11 pgs.

Cong, et al., "Non-Line-of-Sight Error Mitigation in TDOA Mobile Location", IEEE, 2001, 5 pgs.

More, "Generalizations of the trust region problem", Optimization Methods and Software, 2:3-4, 1993, 22 pgs.

Smith, "Closed-Form Least-Squares Source Location Estimation from Range-Difference Measurements", IEEE Transactions on Acoustics, Speech, and Signal Processing, ASSP-35, Dec. 12, 1987, 9 pgs.

Stoica, et al., "Source Localization from Range-Difference Measurements", IEEE Signal Processing Magazine, Nov. 2006, 4 pgs.

Yan, et al., "Improved least-squares algorithm for TDOA/AOA-based localization", Chinese Journal of Radio Science, vol. 31, No. 2, Apr. 30, 2016, 7 pgs.

* cited by examiner

LOCALIZING A TARGET DEVICE BASED ON MEASUREMENTS FROM A MEASUREMENT DEVICE ARRAY

CROSS-REFERENCE TO RELATED APPLICATIONS

This application is a national stage entry of PCT/CN2020/094219, filed Jun. 3, 2020, the disclosure of which is hereby incorporated by reference.

BACKGROUND

The following description relates to localizing a target device based on measurements from a measurement device array.

Localization of mobile devices in wireless networks is important in next-generation mobile communications for delivering location-based services, such as emergency services, location-based social network, and map navigation. Currently, global Navigation Satellite System (GNSS) is used in a variety of safety-critical application, such as air/maritime navigation, advanced driving assistance systems, fleet management, and non-safety critical applications, such as searching for nearby facilities.

DETAILED DESCRIPTION

Figure 1:
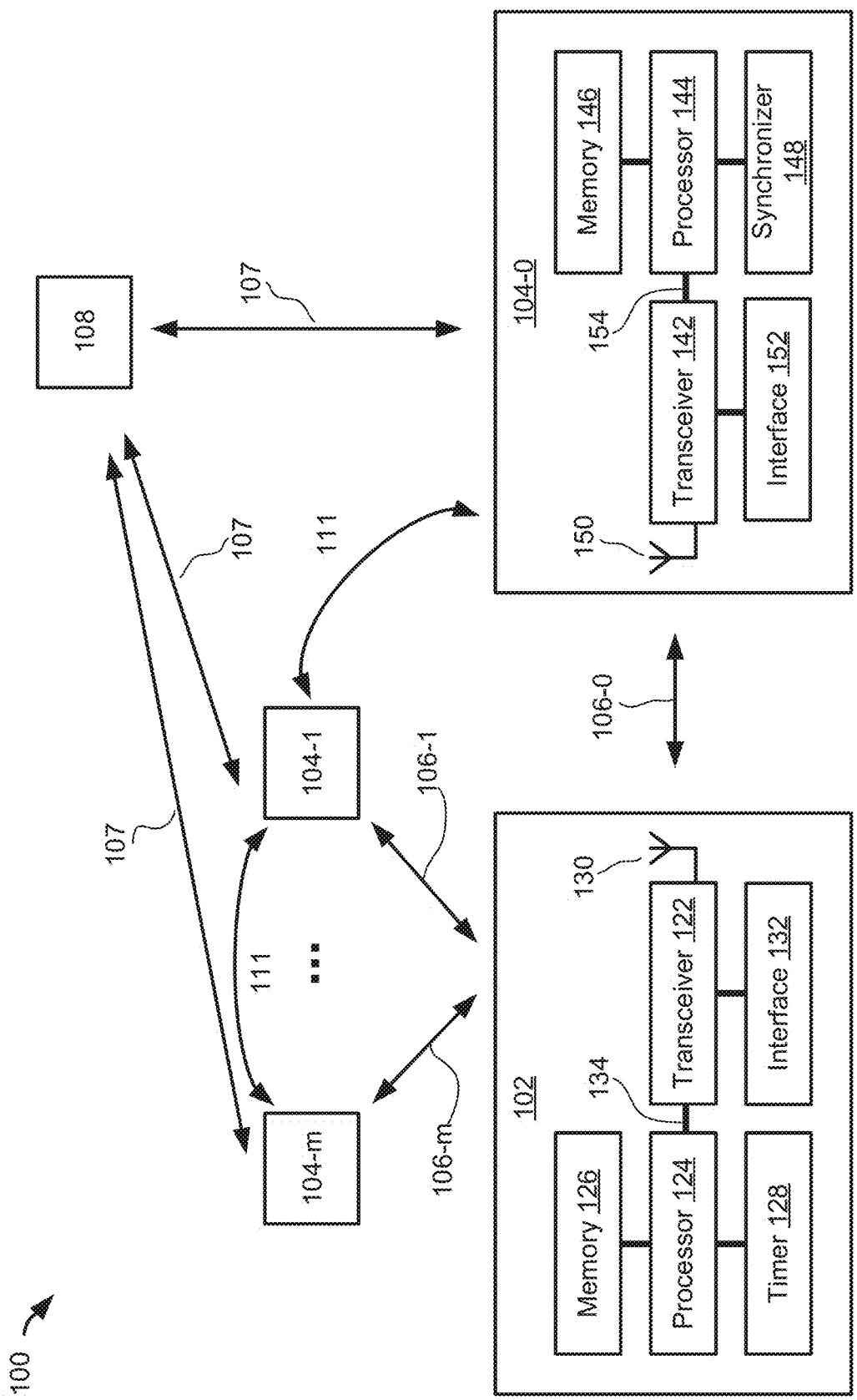
FIG. 1 is a block diagram showing aspects of an example communication system.

In some aspects of what is described, a target device can be localized using a measurement device array. In some instances, range difference values ($d_i$) and coordinate vectors ($\underline{a}_i$) of devices in the measurement device array are obtained. The range difference values are generated based on time difference of arrival (TDoA) measurements of wireless signals between the target device and each of the devices in the measurement device array. A first matrix (A) and a first vector (b) are constructed. The first matrix (A) and the first vector (b) each includes the range difference values and the coordinate vectors. Whether a second vector (y) satisfying a condition set can be determined. The condition set includes a first condition $(A^T A + \lambda D)y = A^T b$ and a second condition $v^T(A^T A + \lambda D)v \geq 0$. A numerical approximation of an optimal solution of the second vector can be generated based on a result of determining whether the second vector (y) satisfies the condition set. The target device can be localized according to the numerical approximation of the optimal solution.

In some implementations, the systems and methods described here can be used in long-distance communication systems, such as cellular, microwave, satellite, underwater acoustic communication, or another type of system. In some implementations, the systems and methods described here can be used in short-distance communication systems, such as Near Field Communication (NFC), Radio Frequency Identification (RFID), Wi-Fi, Bluetooth, or another type of system. In some implementations, the systems and methods may be used in a hybrid communication system with a combination of different technologies.

In some implementations, the systems and methods described here can provide technical advantages and improvements. In some implementations, the systems and methods described here provide an easy and complete algorithm for determining an optimal solution to a constrained least squares problem. In some instances, the systems and methods described here can also be used to determine a numerical approximation of the optimal solution at a high accuracy and allows target localization at a high precision. In some instances, the systems and methods can be used in safety-critical and liability critical positioning applications. In some instances, the systems and methods can be used to guide system configuration for enhanced localization performance. In some instances, the systems and methods disclosed here may provide low computational demand at a comparable accuracy with no additional hardware cost and can be applied for real-time target tracking/positioning. In some cases, a combination of these and potentially other advantages and improvements may be obtained.

In some implementations, the TDoA measurements are performed in a wireless communication system. In some instances, a time difference value between a first time when a wireless signal is transmitted from the target device and a second time when the wireless signal is received by a measurement device in the measurement device array is determined. In some examples, time difference values can be used to determine range values between the respective measurement devices and the target device. In some instances, a reference device can be selected from the measurement devices in the measurement device array. In some instances, a range difference value ($d_i$) is determined as the difference between an i-th range value and a reference range value, where the i-th range value is defined between the target device and the i-th measurement device and the reference range value is defined between the target device and the reference device. In some instances, the range difference values may be determined according to Equations (1)-(4) shown in FIG. 2 or in another manner. In some instances, the range difference values may be determined by the reference device, the target device or by another device. In some instances, coordinate vectors of the measurement devices can be also obtained by the target device or the reference device.

In some implementations, a problem of localization of the target device (e.g., determining a coordinate vector of the target device) can be formulated as a constrained least squares problem subject to a constraint set. In some instances, the constrained least squares problem subject to the constraint set can be then equivalently reformulated to a Lagrangian function. In certain instances, the solution corresponding to the original constrained least squares problem is also the saddle point of the Lagrangian function. In some implementations, solving the solution corresponding to the Lagrangian function can be equivalently converted to determining if there exists a second vector (y) that satisfy the constraint set and the condition set.

In some implementations, a first matrix $$A = \begin{bmatrix} d_1 & \underline{a}_1^T \\ \vdots & \vdots \\ d_m & \underline{a}_m^T \end{bmatrix},$$

a first vector $$b = \frac{1}{2}\begin{bmatrix} \|\underline{a}_1\|^2 - d_1^2 \\ \vdots \\ \|\underline{a}_m\|^2 - d_m^2 \end{bmatrix},$$

the second vector $y=[\|\underline{x}\|, \underline{x}^T]^T$, second matrix $$D = \begin{bmatrix} 1 & 0_{1\times n} \\ 0_{n\times 1} & -I_n \end{bmatrix},$$

and a third vector (v) satisfies $v^T Dv \leq 0$. In some instances $\underline{x}$ is a coordinate vector of the target device and can be determined according to the second vector y, i is a positive integer and i=1, . . . , m. In some instances, a number of the devices in the measurement device array equals m+1, In some instances, the number of measurement devices in the measurement device array is equal to or greater than four.

In some instances, a solution Lagrange multiplier ($\lambda^*$) can be determined based on a result of determining whether a Lagrange multiplier ($\lambda$) satisfies the condition set and whether the second vector (y) satisfies a constraint set is determined. In some instances, the constraint set includes a first constraint $g(y)=y^T Dy=0$ and a second constraint $[y]_1 \geq 0$, where $[y]_1$ is the first element of the second vector (y). In certain instances, in response to the second vector (y) not satisfying at least one of the first constraint the second constraint, the first condition or the second condition, the target device can be localized according to the optimal solution and the optimal solution equals zero.

In some instances, the solution Lagrange multiplier can be determined by performing a first search of the solution Lagrange multiplier in a first domain. In some instances, in response to the solution Lagrange multiplier being not determined in the first domain, the solution Lagrange multiplier can be determined by performing a second search in a second domain. In some instances, prior to performing the first search, a first value ($\lambda_l$) and a second value ($\lambda_u$) can be determined. In some instances, whether the Lagrange multiplier satisfies the constraint set is determined. In certain examples, the second vector (y) is a function of the Lagrange multiplier $y(\lambda)=(A^T A+\lambda D)^{-1}A^T b$ and $A^T A+\lambda D$ is nonsingular.

In some implementations, a root of a polynomial equation in the first domain is calculated. In response to the root being determined in the first domain, the second constraint is verified. In some instances, in response to the second constraint being satisfied, a numerical approximation of the solution Lagrange multiplier can be determined. The solution Lagrange multiplier is the root of the polynomial equation. In some instances, in response to the second constraint not being satisfied, a sign of a function $$\left(h\left(\frac{\lambda_l + \lambda_u}{2}\right)\right)$$

is determined during the second search. In response to the function is negative $$\left(h\left(\frac{\lambda_l + \lambda_u}{2}\right) < 0\right),$$

the solution Lagrange multiplier equals the first value. The numerical approximation of the optimal solution is determined according to a numerical approximation of the solution Lagrange multiplier. In response to the function is positive $$\left(h\left(\frac{\lambda_l + \lambda_u}{2}\right) > 0\right),$$

the solution Lagrange multiplier equals the second value. The numerical approximation of the optimal solution is determined according to a numerical approximation of the solution Lagrange multiplier.

FIG. 1 is a block diagram showing aspects of an example communication system 100. The example communication system 100 shown in FIG. 1 includes a target device 102, and a measurement device array including multiple (e.g., m+1) measurement devices 104 (e.g., 104-0, 104-1, . . . , 104-m, m is a positive integer). In some instances, the target device 102 and each of the measurement devices 104 communicate with each other over a respective wireless communication channel 106. In some instance, a subset (n) of measurement devices in the measurement device array may communicate with the target device. In some instances, the target device 102 and the measurement devices 104 represents different devices in the example communication system 100. In some instances, the examples system 100 includes at least four measurement devices 104 (e.g., m≥4) with distinct coordinate vectors (e.g., locations of the at least four measurement devices are different). The example communication system 100 may include additional or different features, and the components of the example system may operate as described with respect to FIG. 1 or in another manner.

In some implementations, the example communication system 100 may be associated with long-distance wireless communication technologies. For example, each of the measurement devices 104 may represent as a network side communication device or a base station (BS), including a device 13, an E-UTRA Device B (also known as Evolved Device B, eDeviceB or eNB), a New Generation eNB (ng-eNB) a gDeviceB (also known as gNB) in new radio (NR) technoloy, a pico station, a femto station, or another type of system. The target device 102 may be a terminal side communication device or a user equipment (UE), including a long range communication device like a mobile phone, a smart phone, a personal digital assistant (PDA), tablet, laptop computer, or a short range communication system such as, for example a wearable device, a vehicle with a vehicular communication system and another device. In some instances, the target device 102 and the measurement devices 104 may be capable of wireless communications. In some instances, the example communication system 100 further includes a core network 108, which may communicate with the measurement devices 104. In some implementations, the CN 108 may be a 5G Core Network (GC) or another type.

As shown in FIG. 1, the target device 102 forms direct wireless communication channels 106 with respective measurement devices 104. Particularly, the target device 102 communicates with a first measurement device 104-0 via a first wireless communication channel 106-0, e.g., transmitting an uplink signal or receiving a downlink signal. Similarly, the target device 102 communicates with an i-th measurement device 104-i via an i-th wireless communication channel 106-*i*, where i is a positive integer and i=1, 2, ..., m. In some instances, the measurement devices 104 may directly communicate with each other via a communication channel 111. In some instances, the measurement devices 104 may directly communicate with the CN 108 through a communication channel 107. In some instances, each of the communication channels 107 and 111 may be wired or wireless.

In some implementations, the example communication system 100 may include or be associated with satellite communication technologies. For example, each of the measurement devices 104 may be a positioning satellite, and the target device 102 may be a user equipment, a vehicle, or another object equipped with a GNSS receiver.

In some implementations, the wireless communication channel 106 can include all or part of a connector, a data communication network or another type of communication link. For example, the wireless communication channel 106 can include one or more wireless connections, one or more wireless networks or other communication channels. The wireless communication channel 106 may have any spatial distribution. The wireless communication channel 106 may be public, private, or include aspects that are public and private. For instance, in some examples, the wireless communication channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network. In some implementations, the example system 120 is a hybrid communication system. For example, the measurement devices 104 may include at least one positioning satellite and at least one base station.

As shown in FIG. 1, the target device 102 includes a transceiver 122, an antenna 130, a processor 124, a memory 126, a timer 128 and an interface 132. Similarly, the measurement device 104 includes a transceiver 142, an antenna 150, a processor 144, a memory 146, a synchronizer 148, and an interface 152. Modules of the target device 102 are coupled and interconnected with one another as necessary via a data communication bus 134 and modules of the measurement device 104 are coupled and interconnected with one another as necessary via a date communication bus 154. In some implementations, each of the devices 102, 104 may further include different or additional modules, circuits, processing logic in connection with the modules described in FIG. 1. The components described here in FIG. 1 may be implemented in hardware, computer-readable software, firmware, or combinations thereof.

In some implementations, the transceiver 122 of the target device 102 and the transceiver 142 of the measurement device 104 are configured to communicate via the wireless communication channel 106, and cooperate with a suitably configured RF antenna arrangement 130/150 which can support a particular wireless communication protocol and modulation scheme. In some instances, the transceiver 122 and the transceiver 142 are configured to support industry standards such as the Long Term Evolution (LTE) and emerging 5G standards (e.g., NR), satellite communication standards, and another wireless communication protocols. In some instances, the transceiver 142 of the target device 102 may include a GNSS receiver to receive satellite signals from the measurement devices 104 (e.g., positioning satellites). In some instances, a number of measurement devices 104 that are visible to the target device 102 may depend on a number of constellations that the GNSS receiver of the target device 102 is compatible with. For example, the GNSS receiver in the transceiver 142 may be compatible with at least one of the following technologies, Global Positioning System (GPS), GLObal Navigation Satellite System (GLONASS), Galileo or Beidou.

In some instances, the synchronizer 148 of the measurement device 104 is configured to precisely synchronize at least one atomic clock to a standard time, e.g., Universal Time Coordinated (UTC). In some instances, the timer 128 of the target device 102 may include a GNSS synchronized timer which may receive GNSS signals to synchronize with a satellite and to generate precise timing signal.

In the example communication system 100 shown in FIG. 1, each of the processors 124, 144 is a data-processing apparatus that can execute instructions, for example, generate output data based on data inputs. For example, the processors 124, 144 may run computer programs by executing or interpreting the software, scripts, programs, functions, executables, or other modules stored in the memory 126, 146. In some instances, the processors 124, 144 may perform one or more of the operations shown in FIGS. 3-4.

In some implementations, the processors 124, 144 may be implemented as a general purpose processor, a content addressable memory, a digital signal processor, an application specific integrated circuit, a field programmable gate array, any suitable programmable logic device, discrete gate or transistor logic, discrete hardware components, or any combination thereof. In some instances, the processors 124, 144 may be realized as a microprocessor, a controller, a microcontroller, a state machine, or another type. In some implementations, the processors 124, 144 shown in FIG. 1 can include one or more chips or chipsets that include analog circuitry, digital circuitry or a combination thereof. In some cases, the processors 124, 144 includes multiple processor devices such as, for example, one or more main processors and one or more co-processors. For instance, the processors 124, 144 may include a main processor that can delegate certain computational tasks to a co-processor, which may be configured to perform the computational tasks more efficiently than the main processor or in parallel with other computational tasks performed by other processor devices. In some instances, the processors 124, 144 coordinate vectors or controls operation of other components of the respective devices 102, 104, such as, for example, user interfaces, communication interfaces, peripheral devices and possibly other components.

In some implementations, the memory 126, 146 can include, for example, random access memory (RAM) a storage device (e.g., a writable read-only memory (ROM) or others), a hard disk, or another type of storage medium. The example memory 126, 146 can store instructions (e.g., computer code, a computer program, etc.) associated with an operating system, computer applications and other resources. The memory 126, 146 can also store application data and data objects that can be interpreted by one or more applications or virtual machines running on the respective devices 102, 104. The device 102, 104 can be preprogrammed, or it can be programmed (and reprogrammed), by loading a program from another source (e.g., from a DVD-ROM from a removable memory device, from a remote server, from a data network or from another source). In some cases, the memory 126, 146 stores computer-readable instructions for software applications, scripts, programs, functions, executables or other modules that are interpreted or executed by the processor 124, 144. For example, the computer-readable instructions can be configured to perform one or more of the operations shown in one or more of FIGS. 3-4. In some instances, the memory 126, 146 may also be integrated into their respective processors 124, 144. In some implementations, the memory 126, 146 may each include a cache memory for storing temporary variables or other intermediate information during execution of instructions to be executed by the processors 124, 144, respectively.

In the example shown in FIG. 1, the interface 132, 152 generally represents the hardware, software, firmware, processing logic, and/or other components of the respective devices 102, 104 that enable bi-directional communication between the transceivers 122, 152 and another network components and communication devices configured to communication with the devices 102, 104. For example, the interface 132, 152 may be configured to support Internet or WiMAX traffic. In some implementations, the interface 132, 152 provides an 802.3 Ethernet interface such that the transceivers 122, 142 can communicate with a conventional Ethernet based computer network. In this manner, the interface 132, 152 may include a physical interface for connection to the computer network (e.g., Mobile Switching Center (MSC)). The interface 132, 152 could allow the respective devices 102, 104 to communicate with other each other or the CN 108 over a wired or wireless connection.

In the target device 102 shown in FIG. 1, the interface 132 provides communication with the measurement devices 104 (e.g., via wireless communication channel 106). In some cases, the interface 114 includes a wireless communication interface that provides wireless communication using a wireless protocol or standard. For example, the interface 114 may provide wireless communication via Bluetooth, Wi-Fi Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 132 includes a wired communication interface (e.g., USB, Ethernet) that can be connected to one or more input/output devices, such as, for example, a keyboard, a pointing device, a scanner, or a networking device such as a switch or router, for example, through a network adapter.

In some implementations, a wireless transmission from a transmitting antenna of the target device 102 to a receiving antenna of the measurement device 104 is known as an uplink (UL) transmission, and a wireless transmission from a transmitting antenna of the measurement device 104 to a receiving antenna of the target device 102 is known as a downlink (DL) transmission. In some instances, the transceiver 122 may include a RF transmitter and receiver circuitry that are each coupled to the antenna 130. Similarly, the transceiver 142 may include a BF transmitter and receiver circuitry that are each coupled to the antenna 150. In some instances, operations of the transceiver 122 of the target device 102 and the transceiver 142 of each of the measurement devices 104 are coordinated in time, in frequency or in another manner.

Figure 2:
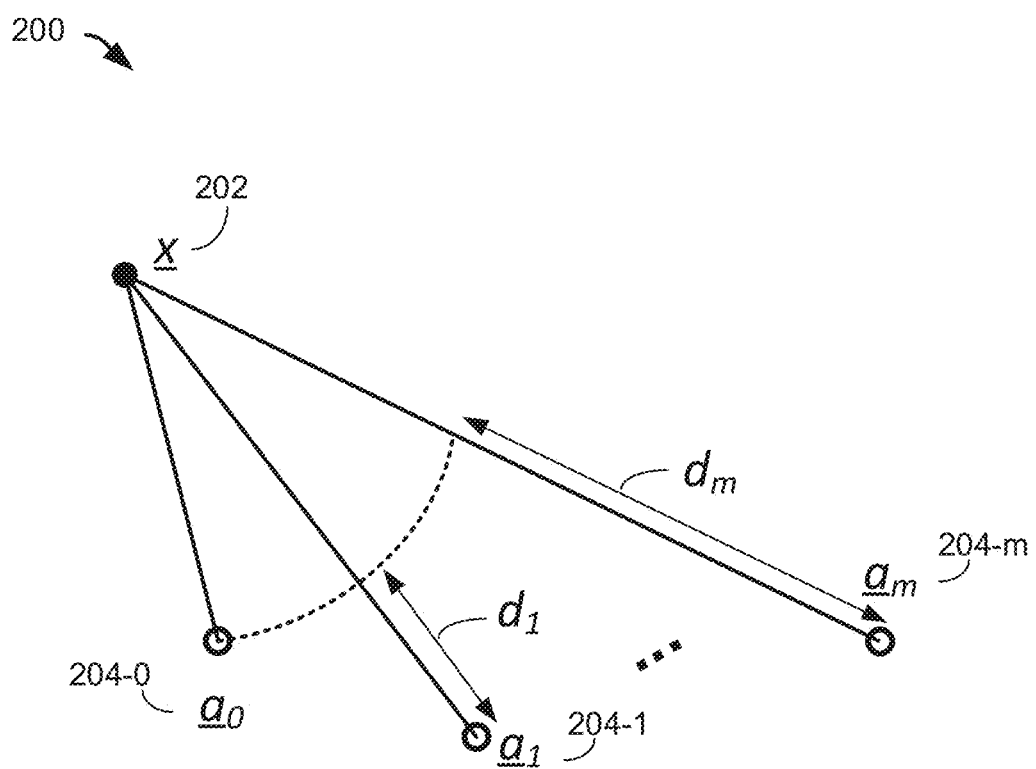
FIG. 2 is a schematic diagram showing an example localization model.

FIG. 2 is a schematic diagram showing aspects of an example localization model. As shown in FIG. 2, the example model 200 includes a target device 202 and a measurement device array including multiple (e.g., m+1) measurement devices 204 (e.g., 204-0, 204-1, 204-m). In some instances, n is an integer and rn is equal to or greater than 3. The example model 200 may be a 2-dimensional (2D) localization model, a 3-dimensional (3D) localization model, or another type of model. In some instances, the example model 200 may be associated with long-distance communication technologies, such as cellular, microwave, satellite, underwater acoustic communication, or another type of technology. In certain instances, the example model 200 may be associated with short-distance communication technologies, such as Near Field Communication (NFC) Radio Frequency Identification (RFID), Bluetooth, or another type of technology. The example model 200 may include additional or different components, and the components may be arranged as shown or in another manner.

In some implementations, the target device 202 in the example model 200 may be a moving target, which has a position as a function of time. In some instances, a speed and/or an acceleration of the target 202 may also be a function of time. In some instances, the target device 202 is an active device (e.g., actively transmits wireless signals to the measurement devices 204 via the UL transmission on the wireless communication channel 106 shown in FIG. 1) and each of the measurement devices 204 may be a passive, stationary device (e.g., passively receives the wireless signals from the target device via the DL transmission on the wireless communication channel 106 shown in FIG. 1). In some instances, the target device 202 may be passive which receives wireless signals from and reflects the wireless signals back to the measurement devices 204 and the measurement devices 204 are active devices which transmit the wireless signals to the target device 202. In some instances, the example model 200 may be used in a hybrid communication system, e.g., a combination of active and passive measurement devices 204 under different communication technologies. In certain instances, at least one of the measurement devices 204 may be a moving device. In some examples, the position of the at least one of the measurement devices 204 is a function of time and is known.

In some implementations, the target device 202 may radiate, emit or reflect signals to the measurement devices 204, e.g., radio frequency signals, microwave signals, optical signals, acoustic signals, or another type of signals. As shown in FIG. 2, each of the measurement devices 204 forms a line-of-sight communication with the target device 202. In certain examples, the signal between the target device 202 and at least one of the measurement devices 204 is under non-line-of-sight condition, e.g., via an obstacle, or otherwise.

In some instances, the measurement devices 204 may include multiple sensors that receive the wireless signals from the target device 202. In some instances, time of arrival (ToA) of the wireless signals at the measurement devices 204 may be used to localize the target device 202, e.g., determine coordinate vectors (e.g., $\underline{x} \in R^n$) of the target device 202. As shown in FIG. 2, $\underline{a}_0$ includes coordinate vectors of a first measurement device 204-0, and $\underline{a}_i$ includes coordinate vectors of the i-th measurement device 204-i, i=1, In some instances, $\underline{a}_i$, $\underline{a}_0$, and $\underline{x}$ are coordinate vectors, e.g., 2×1 coordinate vectors in a 2D localization system or 3×1 coordinate vectors in a 3D localization system. In some instances, the first measurement device 204-0 is a reference device. In certain instances, the reference device may be selected from one of the measurement devices 204 according to a predetermined criteria, or in another manner. The target device 202 and the measurement devices 204 in the example model 200 may be implemented as the target device 102 and the measurement devices 104 shown in FIG. 1 or in another manner.

In some instances, a range difference value can be determined by performing a time difference of arrival (TDoA) measurement which can expressed as:

$$d_i = \|\underline{a}_i - \underline{x}\| - \|\underline{a}_0 - \underline{x}\| + r_i \quad (1)$$

wherein $d_i$ is a range difference value between a first range value and a second range value, $\|\underline{a}_0-\underline{x}\|$ represents the first range value (e.g., reference range value) between the target device 202 and the reference device 204-0, $\|\underline{a}_i-\underline{x}\|$ represents the second range value between the target device 202 and the i-th measurement device 204-$i$, and $r_i$ is a measurement noise for the i-th measurement device 204-$i$, i=1, . . . . . , m. For example, the reference device 204-0 resides at the origin $\underline{a}_0$=[0, 0, 0] in a Cartesian coordinate system, the first and second range values are expressed as $$\|\underline{a}_0-\underline{x}\|=\|\underline{x}\|=\sqrt{x_t^2+y_t^2+z_t^2} \quad (2)$$

$$\|\underline{a}_i-\underline{x}\|=\sqrt{(x_i-x_t)^2+(y_i-y_t)^2+(z_i-z_t)^2} \quad (3)$$

where $\underline{x}$=[$x_t$, $y_t$, $z_t$] is the coordinate vector of the target device 202 and $\underline{a}_i$=[$x_i$, $y_i$, $z_i$] is the coordinate vector of the i-th measurement device 204-$i$, i=1, . . . , m. In some instances, the coordinate vector of the target device 202 can be determined according to the range difference values, e.g., $d_i$, i=1, . . . , m, and the coordinate vectors of the measurement devices.

In some instances, the range difference value $d_i$ can be calculated based on time difference values obtained from the TDoA measurement and propagation speed of the wireless signal, Assuming the wireless signals propagating in a media between the target device 202 and the measurement device 204-$i$ at a constant velocity, the range difference value $d_i$ is expressed as:

$$d_i=(t_i-t_0)\times c \quad (4)$$

where $t_0$ is a first time when the wireless signal is transmitted by the target device 202, $t_i$ is a second time when the wireless signal is received by the measurement device 204-$i$, and and c is the propagation speed of the wireless signal.

In some instances, the measurement noise $r_i$ for the i-th measurement device 204-$i$ may be caused by interference signals from other sources within the example model 200 or from outside of the example model 200. For example, the measurement noise $r_i$ for the i-th measurement device 204-$i$ may be introduced by non-uniform transmission media between the target device 202 and the i-th measurement device 204-$i$. For another example, the measurement noise r for the i-th measurement device 204-$i$ may be caused by clock errors.

Figure 3:
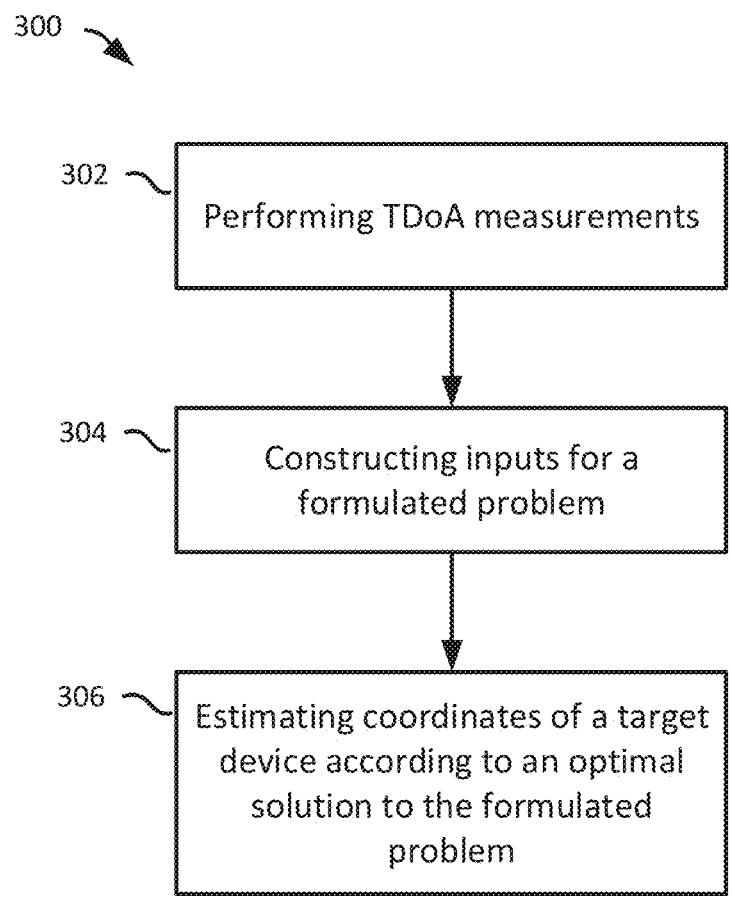
FIG. 3 is a flow chart showing an example localization process.

FIG. 3 is a flow chart showing aspects of an example target localization process 300, In some implementations, aspects of the example process 300 may be performed by a wireless communication system to determine a coordinate vector of a target device. In some instances, the coordinate vector of the target device in the wireless communication system is determined according to a localization model. For instances, operations in the example process 300 may be performed in the communication system 100 shown in FIG. 1 according to the localization model 200. In some instances, the localization process 300 may be implemented in another communication system with additional or different components. The example process 300 may include additional or different operations, the operations may be performed in the order shown or in another order. In some cases, operations in the example process 300 can be combined, iterated or other repeated or performed in another manner.

In some instances, the communication system includes target device and a measurement device array. The measurement device array may include multiple measurement devices. In some instances, the number of measurement devices in the measurement device array is equal to or greater than four. In some instances, one of the measurement devices may be selected as a reference device. In certain examples, coordinate vectors of the measurement devices in the measurement device array are known, which may remain stationary, move according to a known function, or otherwise. In some instances, the wireless signal transmitted between the target device and each of the measurement devices is under line-of-sight, near-line-of-sight, non-line-of-sight condition, or another condition. In some instances, the target device and the measurement device array may be configured as the localization model 200 show in FIG. 2 or in another manner.

At 302, time difference of arrival (TDoA) measurements are performed. In some instances, the target device may broadcast a wireless signal with a first message to the multiple measurement devices, e.g., between the transceivers 122 of the target device 102 and the transceiver 142 of the measurement devices 104. For example, in a cellular wireless communication system, when a target device activates a positioning request, the target device may broadcast the wireless signal carrying the first message which may be received by adjacent measurement devices. In some instances, the positioning request message may include a first time when the positioning request message is broadcasted. In some instances, the first message may be received by at least four measurement devices. In some instances, the first message may be a positioning request message, may be embedded in a system message or in another manner.

In some instances, after receiving the first message, the measurement device determines a second time when the positioning request message is received by the measurement device. In some instances, a time difference value between the first and second time is determined by each of the measurement devices in the measurement device array. In certain instances, time difference values determined by the measurement devices are used to determine range values between the target device and the respective measurement devices. In some instances, a reference node is selected from the measurement device array.

In some instances, each of the measurement devices may transmit a second message to the reference device. In some instances, the second messages from the respective measurement devices may include the time difference values or the range values. In certain examples, the second message further includes the coordinate vectors of the respective measurement devices. In some instances, the second message may also include other information. For example, the second message may include signal power, synchronization, or another type of information which may be used to correct the time difference values and the range values. In some instances, a total time for the wireless signal to propagate from the target device to each of the measurement devices and from each of the measurement devices to the reference device is determined. In some instances, the TDoA measurement may be performed using a signal correlation algorithm or in another manner.

In some implementations, in a satellite positioning system, the target device (e.g., a user equipment) may receive satellite signals from the measurement devices (e.g., satellites). In some instances, the satellite signals may be broadcasted continuously by the measurement devices in a form of bit stream. In some instances, the measurement devices may be synchronized. In some instances, one of the measurement devices may be selected as a reference device. The satellite signal from the reference device is compared with the satellite signals received from the measurement devices to determine the time difference value. In some instances, the time difference values may be determined according to a bit operation or in another manner.

In some instances, range difference values may be determined according to the respective time difference values. In some instances, the range difference values may be determined according to Equations (1)-(4) shown in FIG. 2 or in another manner. In some instances, the range differences may be determined by the reference device, the target device or another device.

At 304, inputs to a formulated problem are constructed. In some instances, the inputs include the range difference values and coordinate vectors of the devices in the measurement device array. In some instances, the coordinate vector of the target device may be estimated according to a regression analysis, e.g., least squares criteria. For example, a problem of determining the coordinate vector of the target device is equivalent to an unconstrained least squares problem, which is a problem of minimizing an objective function, which can be expressed as:

$$\min_{x \in R^n} \sum_{i=1}^{m} (d_i \|x\| + a_i^T x - b_i)^2 \quad (5)$$

where $d_i\|\underline{x}\| + \underline{a}_j^T \underline{x} - b_i = e_i$, a first term $b_i = \frac{1}{2}(\|\underline{a}_i\|^2 - d_i^2)$, a second term $$e_i = \|\underline{a}_i - \underline{x}\| r_i + \frac{r_i^2}{2},$$

n is the dimension of the system (e.g., n=3), and $(\cdot)^T$ is the transpose operator. In some instances, the second term $e_i$ includes the measurement noise $r_i$.

In some instances, the unconstrained least squares problem shown in Equation (5) can be equivalently converted into a constrained least squares problem subject to one or more constraints. In certain instances, the constrained least squares problem, which is a problem of minimizing an objective function $f(y)$ subject to two constraints, can be expressed as:

$$\min_{y \in R^{n+1}} f(y) \quad (6)$$

$$\text{s.t.} \quad g(y) = 0 \quad (7)$$

$$[y]_1 \geq 0 \quad (8)$$

where the objective function $f(y) = \|Ay - b\|^2$, a function $g(y) = y^T Dy$, $[y]_1$ is the first element of a vector $y = [\|\underline{x}\|, \underline{x}^T]^T$, a first matrix $$A = \begin{bmatrix} d_1 & \underline{a}_1^T \\ \vdots & \vdots \\ d_m & \underline{a}_m^T \end{bmatrix},$$

a second matrix $$D = \begin{bmatrix} 1 & 0_{1 \times n} \\ 0_{n \times 1} & -I_n \end{bmatrix},$$

where $0_{i \times j} \in R^{i \times j}$ denotes the matrix whose elements are all 0, and $1_n \in R^{n \times n}$ is an identity matrix. In some instances, the first matrix A has a full column rank which implies $A^T A$ is nonsingular. In some instances, the inputs to the formulated constrained least square problem include the first matrix A and the first vector b.

In some instances, the constrained least squares problem subject to the two constraints may be equivalently reformulated to a Lagrangian function by introducing a variable, e.g., a Lagrange multiplier ($\lambda$). In certain instances, the solution corresponding to the original constrained least squares problem is the saddle point of the Lagrangian function. In some implementations, solving the solution corresponding to the Lagrangian function can be equivalently converted to determining if there exists a vector $y \in R^{n+1}$ satisfying one of the following conditions:

(a) the vector y is an optimal solution (y*) for the original constrained least squares problem (e.g., described by Equations (6)-(8)), if and only if the vector y (y≠0) satisfies the two constraints as described in Equations (7) and (8), and there exists a Lagrange multiplier $\lambda \in R$ such that $$(A^T A + \lambda D)y = A^T b \quad (9)$$

$$v^T(A^T A + \lambda D)v \geq 0 \quad (10)$$

in some instances, v is an intermediate coefficient vector such that $v^T Dv \leq 0$; and (b) the vector y=0 is an optimal solution, if and only if there exists no vector y (y≠0) satisfying the two constraints as described in Equations (7) and (8), and there exists no Lagrange multiplier $\lambda \in R$ satisfying the two conditions described Equations (9)-(10).

At 306, the coordinate vector ($\underline{x}$) of the target device is estimated according to the optimal solution (y*), in some instances, a localization algorithm is used to determine the optimal solution and estimate the coordinate vector of the target device. In some instances, the localization algorithm may be stored in the memory 126 and executed by the processor 124 of the target device 102. In certain examples, the localization algorithm may be stored in the memory 146 and executed by the processor 144 of the reference device 104-0. In some instances, the coordinate vector of the target device is estimated according to a numerical approximation of the optimal solution. In some examples, the numerical approximation of the optimal solution may be obtained by the localization algorithm using a numerical method. In this case, the coordinate vector of the target device may be transmitted back to the target device, for example, when the localization algorithm is performed by the reference device. In some instances, the localization algorithm for determining the optimal solution to the unconstrained least squares problem may be implemented as the localization algorithm 400 shown in FIG. 4 or in another manner.

Figure 4:
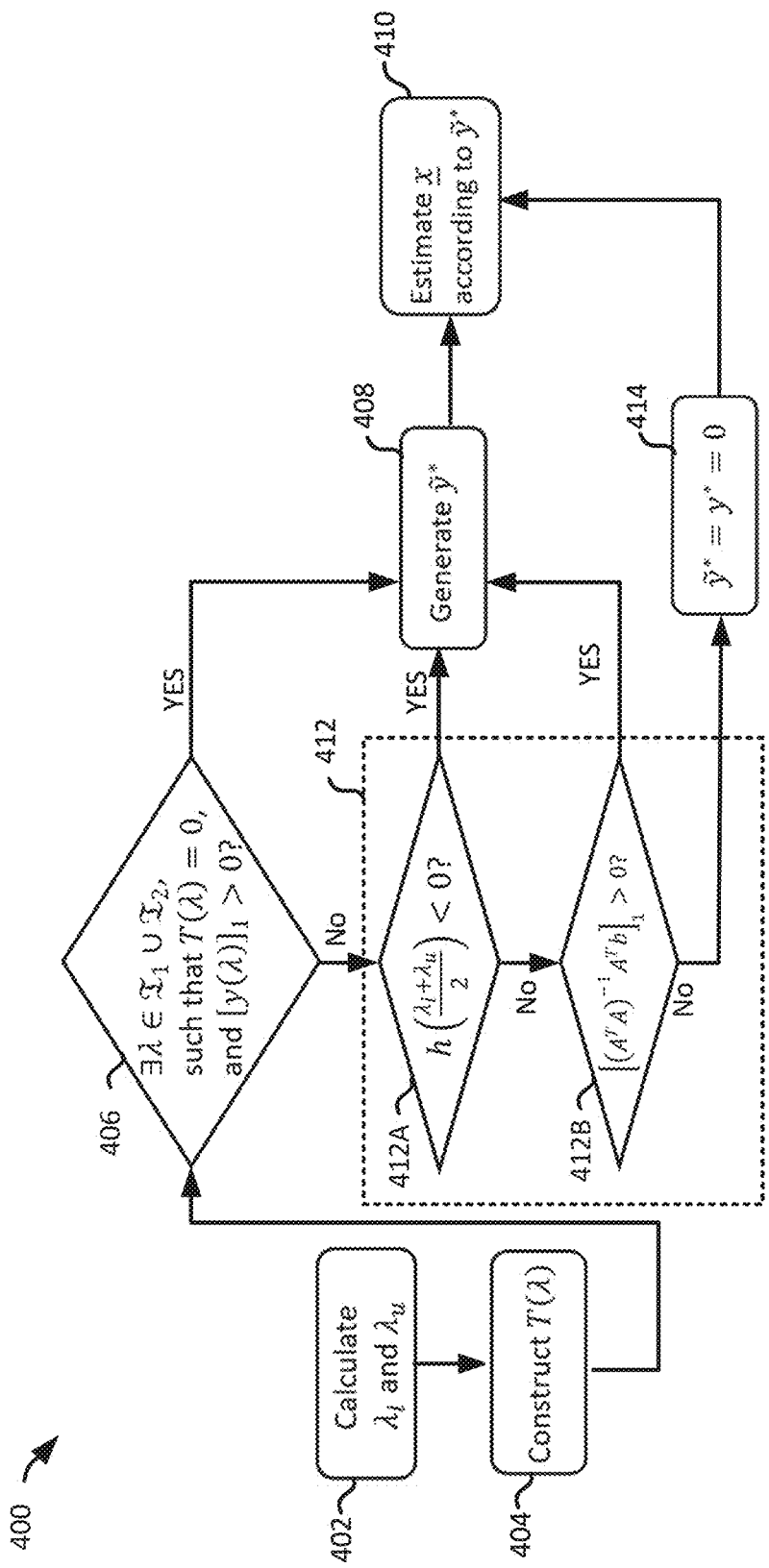
FIG. 4 is a flow chart showing an example localization algorithm.

FIG. 4 is a flow chart showing aspects of an example localization algorithm 400. In some implementations, aspects of the example algorithm 400 may be performed by a device in a communication system to determine a coordinate vector of a target device. In some instances, the communication system may be implemented as the communication system 100 shown in FIG. 1 or in another manner. In certain examples, the example algorithm 400 may be performed by the target device 102 or the reference device 104-0. In some instances, the localization algorithm 400 may be performed in a localization process, e.g., the localization process 300 shown in FIG. 3. The example algorithm 400 may include additional or different operations, the operations may be performed in the order shown or in another order. In some cases, operations in the example algorithm 400 can be combined, iterated or other repeated or performed in another manner.

In some implementations, the example algorithm 400 may be performed to determine an optimal solution to a formulated problem. In some instances, the formulated problem is a Lagrangian function of a constrained least squares problem. The constrained least squares problem includes a constraint set, e.g., the constraints shown in Equations (7)-(8), In some instances, solving the optimal solution to the formulated problem is equivalent to determining whether there exists a vector (y) and a Lagrange multiplier (λ) that satisfy a condition set and the constraint set. In some instances, the condition set may be the condition set shown in Equations (9)-(10), or another condition set may be used in some cases.

At 402, a first value and a second value of the Lagrange multiplier (λ) are determined. In some instances, the first value is a minimum value of the Lagrange multiplier (e.g., $\lambda_l$) and the second value is a maximum value of the Lagrange multiplier (e.g., $\lambda_u$). In some instances, the first and second values can be obtained by performing a convex optimization, for example using semidefinite programing (SDP), which can be expressed as:

$$\lambda_l = \min_{\lambda \in R} \lambda \quad (11)$$

$$\text{s.t.} \quad A^T A + \lambda D > 0 \quad (12)$$

$$\lambda_u = \min_{\lambda \in R} \lambda \quad (13)$$

$$\text{s.t.} \quad A^T A + \lambda D > 0 \quad (14)$$

In some instances, all values of the Lagrange multiplier (λ) satisfying Equation (10) is in an interval $\mathfrak{T}$. In some instances, the interval $\mathfrak{T}$ may be denoted as $\mathfrak{T} = \mathfrak{T}_1 \cup \mathfrak{T}_2$, where a first subinterval $\mathfrak{T}_1 = (\lambda_l, \lambda_u)$, and a second subinterval $\mathfrak{T}_2 = (-\infty, \lambda_l)$. In some instances, a third subinterval ($\bar{\mathfrak{T}}_1$) is a closed form of the first subinterval, e.g., $\bar{\mathfrak{T}}_1 = [\lambda_l, \lambda_u]$. In some instances, a first domain is a union of the first and second subintervals, e.g., $\mathfrak{T}_1 \cap \mathfrak{T}_2 = (\lambda_l, \lambda_u) \cap (-\infty, \lambda_l)$, and a second domain only includes endpoints of the third subinterval, e.g., $\{\lambda_l, \lambda_u\}$.

At 404, a 2n-order polynomial function is constructed. In some instances, n is the dimension of the coordinate vector, e.g., n=3. In some instances, if $A^T A + \lambda D$ is nonsingular, the first constraint (e.g., described in Equations (7)) of the constrained least squares problem may be expressed as $$h(\lambda) = g(y(\lambda)) = 0 \quad (15)$$

where the vector (y) is a function of the Lagrange multiplier (λ), e.g., $y(\lambda) = (A^T A + \lambda D)^{-1} A^T b$.

In some instances, if the matrix $A^T A$ is a positive definite real matrix (e.g., nonsingular), there is a real orthonormal matrix satisfying $A^T A = Q \Lambda Q^T$, where Λ is a diagonal matrix. In some instances, if the matrix $R^T D R$ is real and symmetric, there is a real orthonormal matrix V and a diagonal matrix $\Sigma = V^T R^T D R V$, where a matrix $R = Q \Lambda^{1/2}$ some instances, if P=RV, the matrices $A^T A$ and D can be simultaneously diagonalized using the equations below $$P^T A^T A P = 1 = \text{diag}(1 \ldots, 1) \quad (16)$$

$$P^T D P = \Sigma = \text{diag}(\delta_1, \ldots, \delta_{n+1}) \quad (17)$$

In some instances, a 2n-order polynomial function may be expressed as $$T(\lambda) = \sum_{j=1}^{n+1} \omega_j^2 \delta_j \prod_{k=1, k \neq j}^{n+1} (1 + \lambda \delta_k)^2 \quad (18)$$

wherein $\omega = P^T A^T b$ and $\delta_j$, elements of the diagonal of the diagonal matrix Σ, where j=1, ..., n+1.

In some instances, searching for all Lagrange multiplier λ in the first domain (e.g., $\mathfrak{T}_1 \cap \mathfrak{T}_2$) satisfying the modified first constraint, e.g., Equation (15), of the constrained least square problem, may be equivalently reformulated to solving for the roots of a 2n-order polynomial equation (e.g., T(λ)=0) located in the same domain or in another manner.

At 406, a first search for the Lagrange multiplier (λ*) in the first domain that is a solution to the 2n-order polynomial equation (e.g., T(λ)=0) is performed. In some instances, after determining the roots (e.g., λ*) of the 2n-order polynomial equation in the first domain (e.g., $\mathfrak{T}_1 \cap \mathfrak{T}_2$), the sign of $[y(\lambda^*)]_1$ may be then verified. In certain examples, when the sign of $[y(\lambda^*)]_1$ is positive, e.g., $[y(\lambda)]_1 > 0$, then the vector y(λ*) is the optimal solution (y*). In this case, the example process 400 continues with operation 408, in which a numerical approximation (ŷ*) of the optimal solution (y*) is determined and the coordinate vectors (x) of the target device may be further estimated based on the numerical approximation (ŷ*).

At 408, the numerical approximation (ŷ*) is generated. In some instances, the roots of a 6-order (e.g., n=3) polynomial equation may not have closed-form solutions and a computational error may emerge from the numerical calculation. In some instances, the numerical approximation (ŷ*) can be calculated with a deviation (Δy) satisfying a pre-defined relative precision requirement, which can be expressed as:

$$\frac{\|\Delta y\|}{\|y^*\|} \leq \varepsilon \quad (19)$$

where $\Delta y = \tilde{y}^* - y^*$ and ε is a pre-defined precision.

In some instances, a first derivative and a second derivative of the 2n-order polynomial function T(λ) (e.g., Equation (18)) may be expressed as $T^{[1]}(\lambda)$ and $T^{[2]}(\lambda)$, respectively. In some instances, $T^{[2]}(\lambda) = 0$ is a 4-order polynomial equation. In some instances, roots of the 4-order polynomial equation $T^{[2]}(\lambda) = 0$ have an explicit expression. Let $A_1$ represent a set of all the roots in the first range $\mathfrak{T}_1$ of the 4-order polynomial equation $T^{[2]}(\lambda) = 0$. Define $$T_{A_1}^{[1]} := \min_{\lambda \in A_1} T^{[1]}(\lambda)$$

and $T_{min}^{[1]} := \min \{T_{A_1}^{[1]}, T^{[1]}(\lambda_l), T^{[1]}(\lambda_u)\}$, which gives $$T_{min}^{[1]} = \min_{\lambda \in [\lambda_l, \lambda_u]} T^{[1]}(\lambda).$$

In some instances, two positive variables, e.g., $\varphi_l$ and $\varphi_u$, can be calculated using equations below:

$$\varphi_l = \left|\frac{T(\lambda_l)}{T_{min}^{[1]}}\right| \qquad (20)$$

$$\varphi_u = \left|\frac{T(\lambda_u)}{T_{min}^{[1]}}\right|$$

In some instances, when the solution Lagrange multiplier ($\lambda^*$) that is a root of the 6-order polynomial equation (e.g., $T(\lambda)=0$) is in the first subinterval, e.g., $\lambda^* \in \mathfrak{T}_1$, the solution Lagrange multiplier $\lambda^*$ also resides in a fourth subinterval, e.g., $(\lambda_l+\varphi_l, \lambda_u-\varphi_u)$. Let $g(\lambda_l, \varphi_l, \lambda_u, \varphi_u)=\min\{s_1(A^T A+(\lambda_l+\varphi_l)D), s_1(A^T A+(\lambda_u+\varphi_u)D)\}$, where $s_k(R)$ is the k-th smallest eigenvalue of the matrix R. The Lagrange multiplier satisfies an inequation as expressed below:

$$|\tilde{\lambda}-\lambda^*| \leq \frac{\varepsilon}{(1+\varepsilon)g(\lambda_l, \varphi_l, \lambda_u, \varphi_u)} \qquad (21)$$

where $\tilde{\lambda}$ is the numerical approximation of the solution Lagrange multiplier ($\lambda^*$).

In some implementations, the numerical approximation of the roots of the 2n-order polynomial equation (e.g., $T(\lambda)=0$) may be generated using another numerical method. In some instances, the numerical method has a small computational error of the solution Lagrange multiplier $\lambda^*$ to be able to satisfy the relative precision requirement (e.g., Equation (19)).

In some instances, when the solution Lagrange multiplier ($\lambda^*$) is in a second subinterval (e.g., $\lambda^* \in \mathfrak{T}_2$), a lower bound of the roots of the 2n-order polynomial equation (e.g., $T(\lambda)=0$) is determined as $$\underline{\lambda} = -1 - \max_{i=0}^{n-1} \frac{-q_i}{q_n},$$

where $q_i$ is the coefficients of $T(\lambda)$ with increasing order, i=0, ..., n. Let $\Lambda_2$ represent all the roots of the second derivative equation (e.g., $T^{[2]}(\lambda)=0$). In some instances, all the roots of the second derivative equation (e.g., $T^{[2]}(\lambda)=0$) resides in a fifth subinterval, e.g., $(\underline{\lambda}, \lambda_l)$. Define $$T_{\Lambda_2}^{[1]} := \min_{\lambda \in \Lambda_2} T^{[1]}(\lambda)$$

and $$\text{let } T_{min}^{[1]} := \min\{T_{\Lambda_2}^{[1]}, T^{[1]}(\lambda_l), T^{[1]}(\underline{\lambda})\},$$

which gives $$T_{min}^{[1]} = \min_{\lambda \in [\underline{\lambda}, \lambda_l]} T^{[1]}(\lambda).$$

In some instances, a positive variable, e.g., $\varphi$ may be calculated using:

$$\varphi = \left|\frac{T(\lambda_l)}{T_{min}^{[1]}}\right| \qquad (22)$$

In some instances, when the solution Lagrange multiplier $\lambda^*$ is in the second subinterval, e.g., $\lambda^* \in \mathfrak{T}_2$, the solution Lagrange multiplier $\lambda^*$ also resides in a sixth subinterval, e.g., $(\underline{\lambda}, \alpha_l-\varphi)$, where $\underline{\lambda}$ is the lower bound of the roots of the 2-n polynomial equation shown (e.g., $T(\lambda)=0$), Let $g(\underline{\lambda}, \lambda_k, \varphi)=\min\{-s_1(A^T A+(\lambda_l-\varphi)D), s_2(A^T A+(\lambda_l-D)\}$. In some instances, the numerical approximation ($\tilde{\lambda}$) to the solution Lagrange multiplier ($\lambda^*$) further satisfies an inequation as expressed below:

$$|\tilde{\lambda}-\lambda^*| \leq \frac{\varepsilon}{(1+\varepsilon)g(\underline{\lambda}, \lambda_l, \varphi)} \qquad (23)$$

In some instances, another numerical method may be used to determine the roots of the 2n-order polynomial equation (e.g., $T(\lambda)=0$), e.g., strum's method, Newton methods Or another technique.

At 410, the coordinate vector of the target device is determined according to the numerical approximation of the optimal solution, e.g., $\tilde{y}^*$. In some instances, the numerical approximation of the optimal solution is determined according to the numerical approximation ($\tilde{\lambda}$) of the solution Lagrange multiplier ($\lambda^*$), e.g., $\tilde{y}^*=y(\tilde{y})=(A^T A+\tilde{\lambda}D)^{-1}A^T b$.

In response to the solution Lagrange multiplier not being determined during the first search in the first subinterval, or when the sign of $[y(\lambda)]_1$ is not positive, e.g., $[y(\lambda)]_1 \leq 0$, the example algorithm 400 continues with operation 412. At 412, a second search for the solution Lagrange multiplier is performed in the second domain. In some instances, the second search in the second domain, e.g., $\{\lambda_l, \lambda_u\}$, may be performed, when no root to the $h(\lambda)$ can be determined in the first domain $\mathfrak{T}_1 \cap \mathfrak{T}_2$, when the sign of $[y(\lambda)]_1$ is not positive. In some instances, the sign of a function $$h\left(\frac{\lambda_l+\lambda_u}{2}\right)$$

may be determined during the second search.

$$h\left(\frac{\lambda_l+\lambda_u}{2}\right) < 0,$$

At 412A when the sign of the function is negative, e.g., the example: algorithm 400 continues with operation 408, in which a numerical approximation to the optimal solution is generated. In some instances, when the sign of the function is negative, e.g., $$h\left(\frac{\lambda_l+\lambda_u}{2}\right) < 0,$$

the solution Lagrange multiplier is the first value, e.g., $\lambda^*=\lambda_l$. In this case, since $A^T A+\lambda D$ is singular, its inverse does not exist, and the optimal solution cannot be directly determined using $\lambda^*$.

In some instances, a numerical approximation ($\tilde{y}^*$) of the optimal solution ($y^*$) may be obtained by determining a numerical approximation ($\tilde{\lambda}$) of the solution Lagrange multiplier ($\lambda^*$). In some implementations, a vector $z^-$ such that $\|z^-\|=1$ and $(A^TA+\lambda_l D)z^-=0$ may be selected. In some instances, the numerical approximation ($\tilde{\lambda}$) of the solution Lagrange multiplier ($\lambda^*$) resides in the first subinterval, e.g., $\tilde{\lambda} \in \mathfrak{T}_1$. The numerical approximation ($\tilde{\lambda}$) further satisfies an inequation as expressed below:

$$|\tilde{\lambda} - \lambda_l| \le \frac{\sigma_{min}(A^TA)\|A^Tb\|^2 \varepsilon^2}{\theta \|A^TA+\lambda_l D\|^2} \quad (24)$$

where $\sigma_{min}(A^TA)$ is an eigenvalue of $A^TA$ with the smallest magnitude, and $$\theta = \frac{(5+\sqrt{6})\|b\|^2 \lambda_l^2}{\sigma_{min}^3(A^TA)} \quad (25)$$

Assuming $\tilde{y}=y(\tilde{\lambda})$ a first quadratic equation can be expressed as:

$$(z^-)\alpha^2 + 2\tilde{y}^T Dz^- \alpha + g(\tilde{y}) = 0 \quad (26)$$

In some instances, the first quadratic equation shown in Equation (26) includes two distinct roots, e.g., a first root $\alpha_1^-$ and a second root $\alpha_2^-$. In certain examples, one of the following two values, e.g., $[\tilde{y}+\alpha_1^- z^-]_1$ and $[\tilde{y}+\alpha_2^- z^-]_1$, is positive. For example, when $[\tilde{y}+\alpha_1^- z^-]_1 > 0$, the numerical approximation ($\tilde{y}^*$) of the optimal solution ($y^*$), e.g., $\tilde{y}^* = \tilde{y} + \alpha_1^- z^-$ can satisfy the precision requirement shown in Equation (19). In some instances, the example algorithm 400 continues with operation 410, in which the coordinate vector of the target device may be further determined according to the numerical approximation $\tilde{y}^*$.

In response to the sign of the function not being determined negative, e.g., $$h\left(\frac{\lambda_l + \lambda_u}{2}\right) > 0,$$

the example algorithm 400 continues with operation 412B, in which the sign of $[(A^TA)^{-1}A^Tb]_1$ is determined. In response to $[(A^TA)^{-1}A^Tb]_1 > 0$, the example algorithm 400 continues with operation 408, in which a numerical approximation to the optimal solution is generated. In some instances, when $[(A^TA)^{-1}A^Tb]_1 > 0$, the solution Lagrange multiplier is the second value, e.g., $\lambda^* = \lambda_u$. In this case, the matrix $A^TA+\lambda_u D$ may have multiple zero eigenvalues. In some instances, the number of zero eigenvalues of the matrix $A^TA+\lambda_u D$ is 1. In some instances, a vector $z^+$ such that $\|z^+\|=1$ and $(A^TA+\lambda_u D)z^+=0$ can be selected. In some instances, the numerical approximation ($\tilde{\lambda}$) of the solution Lagrange multiplier ($\lambda^*$) in the first subinterval, e.g., $\tilde{\lambda} \in \mathfrak{T}_1$, is selected, which satisfies an inequation as expressed below:

$$|\tilde{\lambda} + \lambda_u| \le \frac{(\sin \beta^*)^2 s_{l+1}(A^TA)\|A^Tb\|^2 \varepsilon^2}{2\theta \|A^TA+\lambda_u D\|^2} \quad (27)$$

where $s_{l+1}(A^TA)$ is the l+1 smallest eigenvalue of $A^TA$, $\sin \beta^* = \min\{\sin <z^+, v>: v^T Dv \ge 0, [v]_1 > 0\}$. In some instances, an optimal intermediate vector $v$ such that $v^T Dv > 0$ may be obtained by solving a convex optimization problem of maximizing an objective function $(v^T z^+)$ subject to a constrain set, which can be expressed as:

$$\max_v v^T z^+ \quad (28)$$

$$s.t. \{v \in R^{n+1} \mid \|[v]_{2:n+1}\| \le [v]_1\} \quad (29)$$

$$\|v\| \le 1 \quad (30)$$

Let $\tilde{y}=y(\tilde{\lambda})$ and a second quadratic equation can be expressed as:

$$g(z^+)\alpha^2 + 2\tilde{y}^T Dz^+ \alpha + g(\tilde{y}) = 0 \quad (31)$$

In some instances, the second quadratic equation shown in Equation (31) includes two distinct roots, e.g., a first root $\alpha_3^+$ and a second root $\alpha_2^+$. In some instances, both $[\tilde{y}+\alpha_1^+ z^+]_1$ and $[\tilde{y}+\alpha_2^{30} z^+]_1$ are positive. In some instances, the numerical approximation ($\tilde{y}^*$) of the optimal solution ($y^*$), e.g., $\tilde{y}^* = \tilde{y} + \alpha_1^+ z^+$, can satisfy the precision requirement shown in Equation (19). The example algorithm 400 continues with operation 410, in which the coordinate vector of the target device may be further determined according to the numerical approximation $\tilde{y}^*$.

In response to $[(A^T)^{-1}A^Tb]_1 \le 0$, the example algorithm 400 continues with operation 414, a numerical approximation to the optimal solution is generated. In this case, the numerical approximation ($\tilde{y}^*$) of the optimal solution ($y^*$) equals zero, e.g., $\tilde{y}^* = y^* = 0$, and the coordinate vectors ($\underline{x}$) of the target device is at the origin overlapping with the reference device, e.g., $\underline{x} = \underline{a}_0 = [0, 0, 0]$.

Figure 5A:
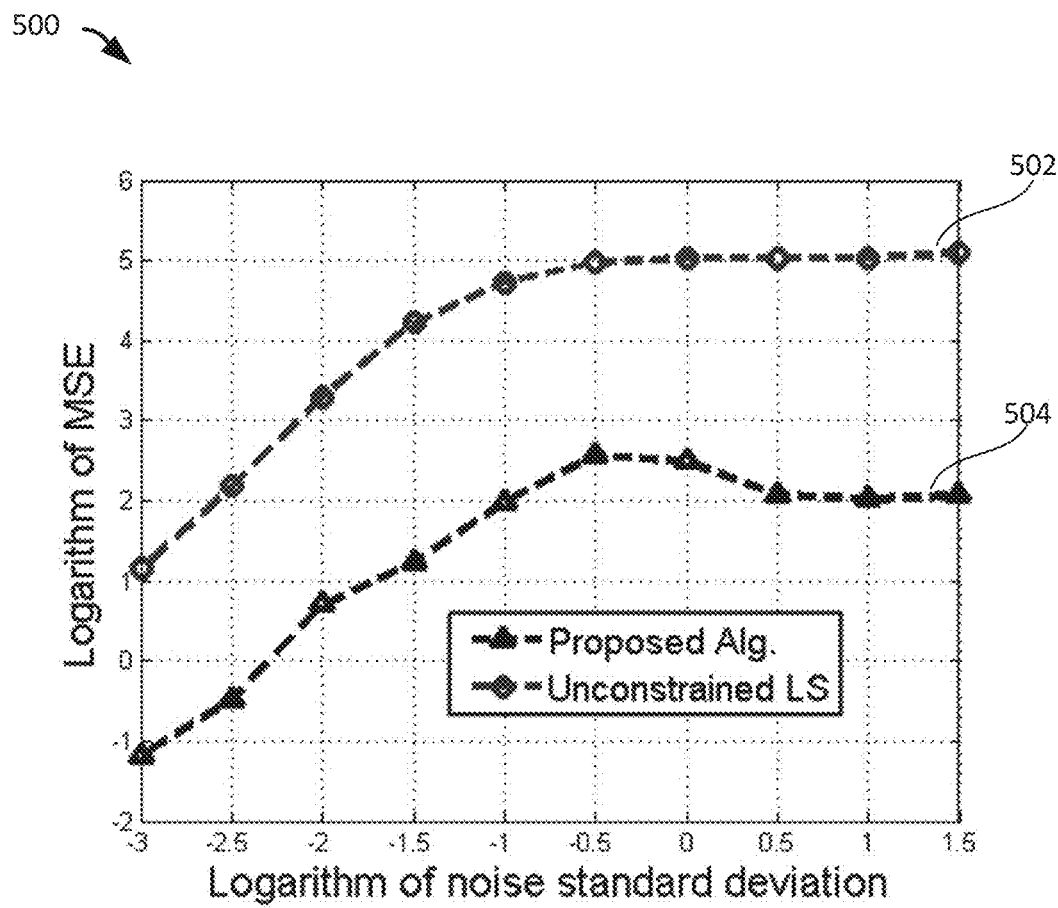
FIGS. 5A-5C are log-log plots showing performance of an example localization algorithm.
Figure 5B:
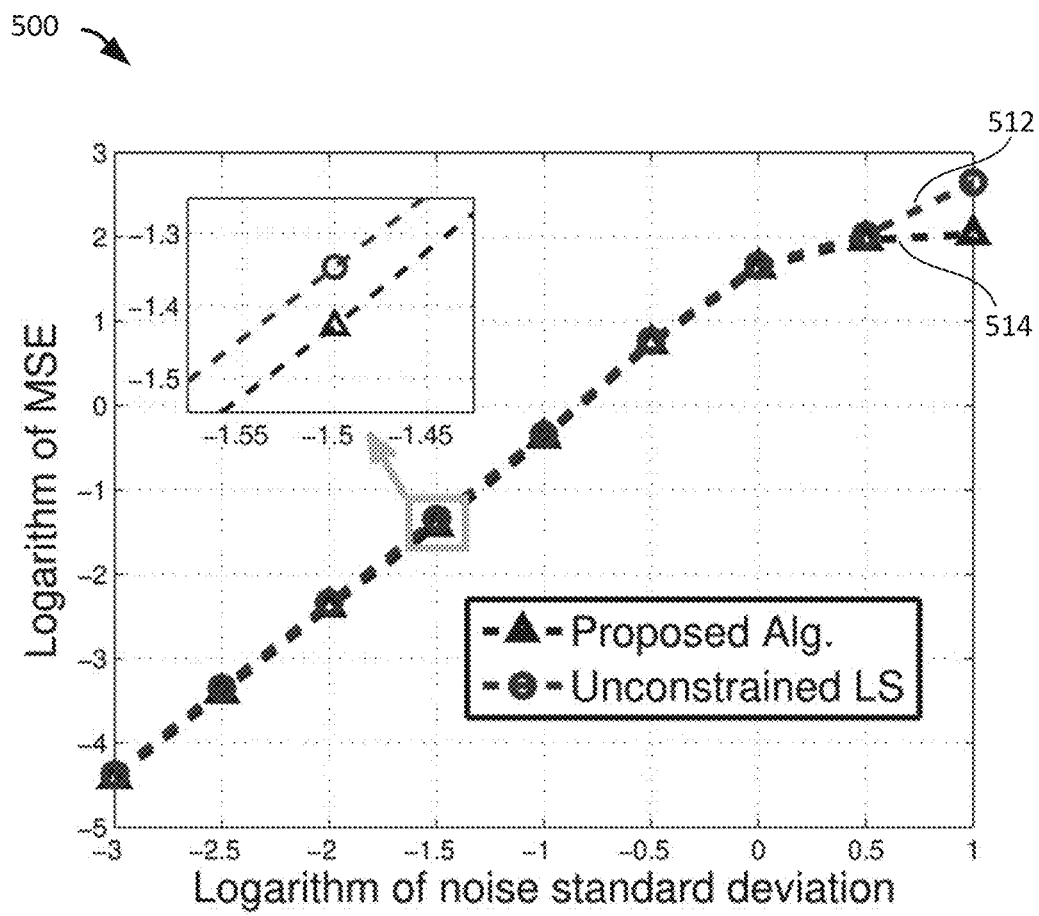
Figure 5C:
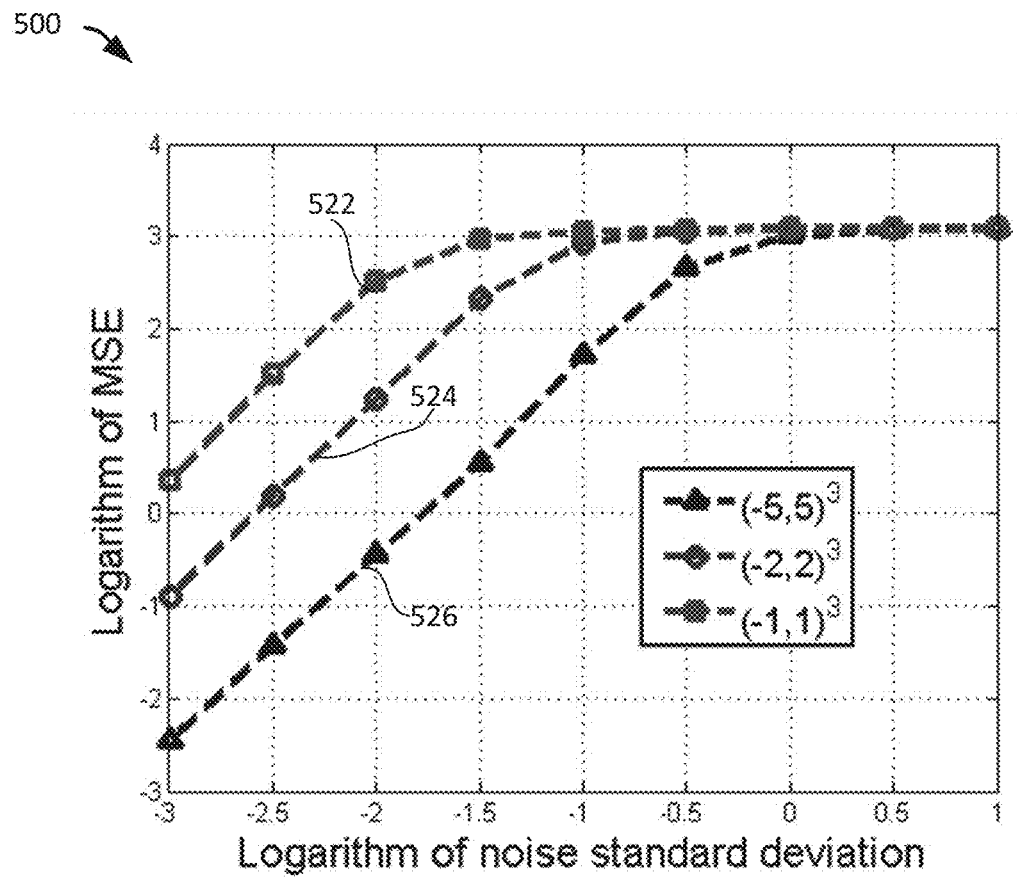

FIGS. 5A-5C are log-log plots 500 showing performance of a localization algorithm. As shown in FIGS. 5A-5C the performance is evaluated by plotting a localization error (y-axis) as a function of a noise standard deviation (x-axis). In some implementations, the localization algorithm may be implemented as the localization algorithm 400 shown in FIG. 4 in the localization process 300 shown in FIG. 3. In some instances, the localization algorithm may be performed by a communication system, e.g., the communication system 100 shown in FIG. 1 or in another manner. In some instances, the communication system includes a target device, and a measurement device array including multiple measurement devices (e.g., m=10). In some instances, a reference device may be selected from the multiple measurement devices, and a coordinate vector of the reference device may be used as the origin of a cartesian coordinate system. In some implementations, a noise energy is introduced by adding a random variable to respective exact range difference values. In some instances, the random variable may have a normal distribution, a zero-mean value, and a variance ($\sigma$). In some instances, multiple simulations (e.g., 1000, 10000 or another number) are performed at each noise standard deviation (e.g., $\sqrt{\sigma}$) value and a localization error (e.g., a mean square error of the coordinate vector of the target device) can be determined.

Performance of the localization algorithm 400 for solving a constrained least squares problem is compared to that of an unconstrained least squares problem. In certain instances, the unconstrained squares problem is constructed based on Equation (6) without subject to the constrains described in Equations (7)-(8). In some instances, an approximate closed-form solution, e.g, $y=(A^TA)^{-1}A^Tb$, to the unconstrained least squares problem can be obtained.

In some instances, the ten measurement devices (e.g., measurement devices 204-1, 204-10 as shown in FIG. 2) are randomly generated with a uniform distribution in a first volume, e.g., $x_i$[−200, −1.90], $y_i$32 [−200, −190], $z_i$=[−200, −190], i is an integer and i=1,2, . . . ,10, and the target device is randomly generated in a second volume, e.g., $x_t$[−10, −10], $y_t$=[−10], [−10], $z_t$=[−10,−10]. Under this configuration, the measurement devices are closely arranged in the first volume comparing to their distances to the reference device at the origin, e.g., $x_r=y_r=z_r=0$, as well as the target device. As shown in FIG. 5A, the localization error of the localization algorithm 400 (curve 504) is less than that obtained by solving the unconstrained least squares problem (curve 502). Particularly, in a noise standard deviation range of $1.5 \geq \log_{10} \geq -3$, the localization error is reduced by at least 2 orders of magnitude using the localization algorithm 400 shown in FIG. 4.

In some instances, the ten measurement devices are randomly generated with a uniform distribution in a third volume, e.g., $x_i$=[−5,5], $y_i$[−5,5], $z_i$=[−5,5], and the target device is randomly generated in the second volume, e.g., $x_t$=[−10,10], $y_t$=[−10,10], $z_t$=[−10,10]. Under this configuration, the measurement devices are close to the reference device as well as the target device. As shown in FIG. 5B, the localization error of the localization algorithm 400 (curve 514) is less than that obtained by solving the unconstrained least squares problem (curve 512) by a small amount. Particularly, in a noise standard deviation range of $0.5 \geq \log_{10} \sqrt{\sigma} \geq -3$, the localization error can be improved using the localization algorithm 400.

As shown in FIG. 5C, the target device has a fixed coordinate at $x_t=y_t=z_t=20$. Performance of the localization algorithm 400 when the measurement devices are uniformly distributed in three volumes are compared, including the third volume, e.g., $x_i$=[−5,5], $y_i$=[−5,5], $z_i$=[−5,5]; a fourth volume, e.g., [−2,2], $y_i$=[−2,2], $z_i$=[−2,2]; and a fifth volume, e.g., $x_i$=[−1,1], =$y_i$=[−1,1], $z_i$=[−1,1]. As shown in FIG. 5C, physical arrangement of the measurement devices affects the localization error. Particularly, when the measurement devices are spread out (e.g., in the third volume), such relatively large separation between each of the measurement devices can prominently reduce the localization error (e.g., lower MSE value) when the noise standard deviation is relatively small. For example, in a noise standard deviation range of $0 \geq \log_{10} \sqrt{\sigma} \geq -3$, the localization error obtained with the measurement devices uniformly distributed in the fifth volume (e.g., curve 522) is greater than that obtained with the ten measurement devices uniformly distributed in the fourth volume (e.g., curve 524). The localization error obtained with the ten measurement devices distributed in the third volume is can be further reduced (e.g., curve 526). As shown in FIG. 5C, the localization errors obtained under the three configurations in a noise standard deviation range of $\log_{10} \sqrt{\sigma} \geq 0$ are comparable. In some implementations, separation of the measurement devices and distances between each of the measurement device and the reference device may be balanced.

The following description provides a proof that solving for the solution of the constrained least squares problem (e.g., Equations (6)-(8)) is equivalent to determining if there exists a vector $y \in \mathbb{R}^{n+1}$ satisfying the conditions set described in Equations (9)-(10). The Lagrangian function of the constrained least squares problem (e.g., Equations (6)-(8)) can be expressed as $$\mathcal{L}(y,\lambda) = f(y) + \lambda g(y) \quad (32)$$

where $\nabla_y \mathcal{L}(y, \lambda)$ is well defined at $y \neq 0$.

Necessity. Suppose $y^*$ is a optimal solution of the constrained least squares problem (e.g., Equations (6)-(8)), two cases are considered. When $y^* \neq 0$, the conditions $g(y^*)=0$ and $[y^*]_1 > 0$ are readily met. The Karush-Kuhn-Tucker (KKT) optimality condition ensures that there exists a multiplier $\lambda^*$ such that $\nabla_y \mathcal{L}(y^*, \lambda^*)=0$, the first condition, e.g., Equation (9) follows. It further leads to the following result: for any $y$ with $[y]_1 \geq 0$, $$\mathcal{L}(y,\lambda^*) = \mathcal{L}(y^*,\lambda^*) + (y-y^*)^T (A^T A + \lambda^* D)(y-y^*) \quad (33)$$

Since $\mathcal{L}(y,\lambda^*) = f(y)$ whenever $g(y)=0$, we have that the second condition e.g., Equation (10) holds for $v \in \mathcal{T} := \{v: g(y^*+v)=0, [v]_1 \geq -[y^*]_1\}$. We will use this fact to show Equation (10). To this end, denote $\mathcal{S} := \{v: v^T D v \leq 0\}$ and partition $\mathcal{S}$ into a few disjoint subsets, where $$\mathcal{S}_1 = \{v: v^T D y^* > 0, v^T D v < 0\} \quad (34)$$

$$\mathcal{S}_2 = \{v: v^T D y^* > 0, v^T D v < 0\} \quad (35)$$

$$\mathcal{S}_3 = \{v: v^T D y^* = 0, v^T D v = 0\} \quad (36)$$

$$\mathcal{S}_4 = \mathcal{S} / (\mathcal{S}_1 \cup \mathcal{S}_2 \cup \mathcal{S}_3) \quad (37)$$

For any $v \in S_1$, there always exists a constant $\psi > 0$ such that $g(y^*+\psi v) = g(y^*) + 2\psi v^T D y^* + \psi^2 v^T D v = g(y^*) = 0$. Next we will show $[\psi v]_1 > -[y^*]_1$. Suppose that $[y^*]_1 + [\psi v]_1 \leq 0$ is true. Then $([y^*]_1 + [\psi v]_1)[y^*]_1 \leq 0$, by which we further have $$v^T D y^* = \frac{1}{\psi}(y^* + \psi v)^T D y^*$$

$$= \frac{1}{\psi}([y^*]_1 + [\psi v]_1)[y^*]_1 - \frac{1}{\psi}[y^* + \psi v]_{2:n+1}^T [y^*]_{2:n+1}$$

$$\leq \frac{1}{\psi}([y^*]_1 + [\psi v]_1)[y^*]_1 - \frac{1}{\psi}\|[y^* + \psi v]_{2:n+1}^T\|\|[y^*]_{2:n+1}\|$$

$$= 0$$

The above inequality contradicts $v \in \mathcal{S}_1$. Therefore, it is clear that $\varphi v \in \mathcal{T}$. Then, we conclude that the second condition, e.g., Equation 10, holds for any $v \in \mathcal{S}_1$.

For any $v \in \mathcal{S}_2$, we obtain that $-v \in \mathcal{S}_1$. Therefore, the second condition, e.g., Equation (10) holds for any $v \in \mathcal{S}_2$. Similarly, for any $v \in \mathcal{S}_3$, we have that $g(y^*+\varphi v)=0$ for any $\varphi \in \mathbb{R}$ and $[\varphi v]_1 + [y^*]_1 \geq 0$ when $\varphi$ is sufficiently small. It implies that $\varphi v \in \mathcal{T}$. Thus, we have the second condition, e.g., Equation (10) holds for any $v \in \mathcal{S}_3$.

Finally, since each element of $\mathcal{S}_4$ is a limit point of $\mathcal{S}_1$, $\mathcal{S}_2$ or $\mathcal{S}_3$, the continuity of $v^T(A^T A + \lambda^* D)v$ in $v$ implies that also the second condition, e.g., Equation (10) holds for $v \in \mathcal{S}_4$. So far we have shown the second condition holds for the case of $y^* \oplus 0$.

When $y^*=0$, we will prove the result by contradiction. Suppose that there exists at least a numerical approximation $\tilde{y} \neq 0$ such that $g(\tilde{y})=0$ and $[\tilde{y}]_1 > 0$, and there corresponds a solution Lagrange multiplier $\lambda^*$ satisfying (1). Then by Equation (33) we have $$f(0q) \quad (39)$$

$$= \mathcal{L}(0, \lambda^*)$$

$$= \mathcal{L}(\tilde{y}, \lambda^*) + \tilde{y}^T (A^T A + \lambda^* D) \tilde{y}$$

$$= f(\tilde{y}) + \tilde{y}^T (A^T A + \lambda^* D) \tilde{y}$$

Since $\tilde{y}^T D \tilde{y} = 0$ and $\tilde{y} \neq 0$, $$\tilde{y}^T(A^T A + \lambda D)\tilde{y} > 0 \quad (40)$$

It thus follows that $f(0) > f(\tilde{y})$, which contradicts the hypothesis.

Sufficiency. Suppose that $y^* \in \mathbb{R}^{n+1}$ and $\lambda^* \in \mathbb{R}$ is a vector and a multiplier, respectively, which satisfy (i). Then we have $\nabla_y \mathcal{L}(y^*, \lambda^*) = 0$, which further yields the result of (11). Let $y \neq y^*$ be any given vector satisfying $g(y) = 0$ and $[y]_1 \geq 0$. Then y and y* have the following geometric relation $$\nabla g(y^*)(y-y^*) = 2y^{*T}D(y-y^*) \geq 0 \quad (41)$$

Indeed, $-Dy^*$ is the normal vector of the cone $\{y \in \mathbb{R}^{n+1}: y^T D y \leq 0\}$ at y*, and y*-y is orthogonal to or form an acute angle with the normal vector. In addition, notice that $$g((y) = g(y^*) + \nabla g(y^*)(y-y^*) + \tfrac{1}{2}(y-y^*)^T \nabla^2 g(y^*)(y-y^*) \quad (42)$$

Since $g(y) = 0$, it holds that $$(y-y^*)^T \nabla^2 g(y^*)(y-y^*) = 2(y-y^*)^T D(y-y^*) \geq 0 \quad (43)$$

In other words, by (41) and (43), we can find a vector $v = y - y^*$ satisfying $v^T \nabla^2 g(y^*)v \geq 0$, which together with (33) implies that $$\mathcal{L}(y, \lambda^*) = \mathcal{L}(y^*, \lambda^*) + \frac{\alpha^2}{2} v^T(A^T + \lambda^* D)v \geq \mathcal{L}(y^*, \lambda^*) \quad (44)$$

where the inequality follows from (7). Observing that $g(y) = g(y^*) = 0$, then the above inequality yields that $$f(y^*) \leq f(y) \quad (45)$$

which shows that y* is a global optimal solution of the constrained least squares problem, e.g, Equations (6)-(8), Next we will show that (b) the vector $y = 0$ is an optimal solution, if and only if there exists no vector y ($y \neq 0$) satisfying the two constraints as described in Equations (7) and (8), and there exists no Lagrange multiplier $\lambda \in \mathbb{R}$ satisfying the two conditions described Equations (9)-(10), is a sufficient condition for the optimality of y. Suppose that $y^{*'} = 0$ is not an optimal solution to the constrained least squares problem, e.g., Equation (6)-(8). we can find at least a vector $\tilde{y} \neq 0$ that is a optimal solution of the constrained least squares problem. By the argument used for showing the necessity, we conclude that the condition set (Equations (9)-(10)) hold for y, which contradicts (b).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data-processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of what is described above, localizing a target device based on measurements from a measurement device array is disclosed.

In a first example, range difference values ($d_i$) and coordinate vectors ($\underline{a}_i$) of devices in the measurement device array are obtained. The range difference values are generated based on time difference of arrival measurements of wireless signals between the target device and each of the devices in the measurement device array. A first matrix (A) and a first vector (b) are constructed. The first matrix (A) and the first vector (b) each includes the range difference values and the coordinate vectors. Whether a second vector (y) satisfies a condition set is determined. The condition set includes a first condition $(A^T A+\lambda D)y=A^T b$ and a second condition $v^T(A^T A+\lambda D)v \geq 0$. A numerical approximation of an optimal solution of the second vector is generated based on a result of determining whether the second vector (v) satisfies the condition set. The target device is localized according to the numerical approximation of the optimal solution.

In a second example, a computing system includes one or more processors and a computer-readable medium storing instructions that are operable when executed by the one or more processors to perform one or more operations of the first example.

In a third example, a non-transitory computer-readable medium stores instructions that are operable when executed by a data-processing apparatus to perform one or more operations of the first example.

Implementations of the first, second, or third example may include one or more of the following features. The second condition is $v^T(A^T A+\lambda D) > 0$. The first matrix $$A = \begin{bmatrix} d_1 & \underline{a}_1^T \\ \vdots & \vdots \\ d_m & \underline{a}_m^T \end{bmatrix},$$

the first vector $$b = \frac{1}{2} \begin{bmatrix} \|\underline{a}_1\|^2 - d_1^2 \\ \vdots \\ \|\underline{a}_m\|^2 - d_m^2 \end{bmatrix},$$

the second vector $y=[\|\underline{x}\|,\underline{x}^T]^T$, a second matrix $$D = \begin{bmatrix} 1 & 0_{1 \times n} \\ 0_{n \times 1} & -I_n \end{bmatrix},$$

and a third vector (v) satisfies $v^T D v \geq 0$. $\underline{x}$ is a coordinate vector of the target device, i is a positive integer and i=1, ..., m. A number of the devices in the measurement device array equals m+1. The number of measurement devices in the measurement device array is equal to or greater than four.

Implementations of the first, second, or third example may include one or more of the following features. A solution Lagrange multiplier ($\lambda^*$) is determined based on a result of determining whether a Lagrange multiplier ($\lambda$) satisfies the condition set and whether the second vector (y) satisfies a constraint set is determined. The constraint set includes a first constraint g $(y)=y^T D y=0$ and a second constraint $[y]_1 \geq 0$, where $[y]_1$ is the first element of the second vector (y). In response to the second vector (y) not satisfying at least one of the first constraint, the second constraint; the first condition or the second condition, the target device is localized according to the optimal solution and the optimal solution equals zero.

Implementations of the first, second, or third example may include one or more of the following features. The solution Lagrange multiplier is determined by performing a first search of the solution Lagrange multiplier in a first domain, and in response to the solution Lagrange multiplier being not determined in the first domain, performing a second search of the solution Lagrange multiplier in a second domain. Prior to performing the first search, a first value ($\lambda_l$) and a second value ($\lambda_u$) are determined. Whether the Lagrange multiplier satisfies the constraint set is determined. The second vector (y) is a function of the Lagrange multiplier $y(\lambda)=(A^T A+\lambda D)^{-1} A^T b$ and $A^T A+\lambda D$ is nonsingular.

Implementations of the first, second, or third example may include one or more of the following features. A root in the first domain of a polynomial equation is calculated. In response to the root being determined in the first domain, the second constraint is verified. In response to the second constraint being satisfied, a numerical approximation of the solution Lagrange multiplier is determined. The solution Lagrange multiplier is the root of the polynomial equation. A sign of a function $$\left(h\left(\frac{\lambda_l + \lambda_u}{2}\right)\right)$$

is determined. In response to the function is negative $$\left(h\left(\frac{\lambda_l + \lambda_u}{2}\right) < 0\right),$$

the solution Lagrange multiplier equals the first value. The numerical approximation of the optimal solution is determined according to a numerical approximation of the solution Lagrange multiplier. In response to the function is positive $$\left(h\left(\frac{\lambda_l + \lambda_u}{2}\right) > 0\right),$$

the solution Lagrange multiplier equals the second value. The numerical approximation of the optimal solution is determined according to a numerical approximation of the solution Lagrange multiplier.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A localization method for localizing a target device using a measurement device array, the method comprising:
    obtaining range difference values ($d_i$) and coordinate vectors ($\underline{a}_i$) of devices in the measurement device array, wherein the range difference values are generated based on time difference of arrival measurements of wireless signals between the target device and each of the devices in the measurement device array;
    constructing a first matrix (A), a first vector (b), and a second vector (y), the first matrix (A) and the first vector (b) each comprising the range difference values and the coordinate vectors, wherein the first matrix $$A = \begin{bmatrix} d_1 & a_1^T \\ \vdots & \vdots \\ d_m & a_m^T \end{bmatrix},$$

the first vector $$b = \frac{1}{2}\begin{bmatrix} \|\underline{a}_1\|^2 - d_1^2 \\ \vdots \\ \|\underline{a}_m\|^2 - d_m^2 \end{bmatrix},$$

the second vector $y=[\|\underline{x}\|, \underline{x}^T]^T$, i is a positive integer, and i=1, m, $\underline{x}$ is a coordinate vector of the target device, and a number of the devices in the measurement device array equals m+1;
    identifying a condition set, the condition set comprising: a first condition $(A^TA+\lambda D)y=A^Tb$ and a second condition $v^T(A^TA+\lambda D)v\geq 0$ for all third vectors (v) satisfying $v^TDv\leq 0$, wherein a second matrix $$D = \begin{bmatrix} 1 & 0_{1\times n} \\ 0_{n\times 1} & -I_n \end{bmatrix}$$

and $\lambda$ is a Lagrange multiplier;
    determining whether the second vector (y) satisfies the condition set;
    generating a numerical approximation of an optimal solution of the second vector (y) based on a result of determining whether the second vector (y) satisfies the condition set; and
    localizing the target device according to the numerical approximation of the optimal solution.

2. The localization method of claim 1, wherein the number of the devices in the measurement device array is equal to or greater than four.

3. The localization method of claim 1, wherein determining whether the second vector (y) satisfies the condition set further comprises:
    determining a solution Lagrange multiplier ($\lambda^*$) based on a result of determining whether the Lagrange multiplier ($\lambda$) satisfies the condition set; and
    determining whether the second vector (y) satisfies a constraint set, the constraint set comprising a first constraint $g(y)=y^T Dy=0$ and a second constraint $[y]_1\geq 0$, wherein $[y]_1$ is the first element of the second vector (y).

4. The localization method of claim 3, further comprising:
    in response to the second vector (y) not satisfying at least one of the first constraint, the second constraint, the first condition or the second condition, localizing the target device according to the optimal solution, wherein the optimal solution equals zero.

5. The localization method of claim 3, wherein determining the solution Lagrange multiplier comprises:
    performing a first search of the solution Lagrange multiplier in a first domain; and
    in response to the solution Lagrange multiplier being not determined in the first domain, performing a second search of the solution Lagrange multiplier in a second domain.

6. The localization method of claim 5, wherein determining the solution Lagrange multiplier further comprises:
    prior to performing the first search, determining a first value ($\lambda_l$) and a second value ($\lambda_u$).

7. The localization method of claim 6, wherein performing the second search comprises:
determining a sign of a function $$\left(h\left(\frac{\lambda_l + \lambda_u}{2}\right)\right),$$

wherein $h(\lambda)=g(y(\lambda))$.

8. The localization method of claim 7, wherein in response to the function is negative $$\left(h\left(\frac{\lambda_l + \lambda_u}{2}\right) < 0\right),$$

the solution Lagrange multiplier equals the first value.

9. The localization method of claim 8, further comprising:
determining the numerical approximation of the optimal solution according to a numerical approximation of the solution Lagrange multiplier.

10. The localization method of claim 7, wherein in response to the function is positive $$\left(h\left(\frac{\lambda_l + \lambda_u}{2}\right) > 0\right),$$

the solution Lagrange multiplier equals the second value.

11. The localization method of claim 10, further comprising:
determining the numerical approximation of the optimal solution according to a numerical approximation of the solution Lagrange multiplier.

12. The localization method of claim 5, wherein performing the first search comprises:
determining whether the Lagrange multiplier satisfies the constraint set, wherein the second vector (y) is a function of the Lagrange multiplier $y(\lambda)=(A^TA+\lambda D)^{-1}A^Tb$ and $A^TA+\lambda D$ is nonsingular.

13. The localization method of claim 12, wherein determining whether the Lagrange multiplier satisfies the constraint set comprises:
calculating a root in the first domain of a polynomial equation; and
in response to the root being determined in the first domain, verifying the second constraint; and
in response to the second constraint being satisfied, determining a numerical approximation of the solution Lagrange multiplier, the solution Lagrange multiplier being the root of the polynomial equation.

14. The localization method of claim 13, wherein the polynomial equation has an order of 6.

15. A computer system comprising:
one or more processors; and
memory storing instructions that, when executed, cause the computer system to perform operations comprising:
obtaining range difference values ($d_i$) and coordinate vectors ($\underline{a}_i$) of devices in the measurement device array, wherein the range difference values are generated based on time difference of arrival measurements of wireless signals between the target device and each of the devices in the measurement device array;
constructing a first matrix (A), a first vector (b), and a second vector (y), the first matrix (A) and the first vector (b) each comprising the range difference values and the coordinate vectors, wherein the first matrix $$A = \begin{bmatrix} d_1 & \underline{a}_1^T \\ \vdots & \vdots \\ d_m & \underline{a}_m^T \end{bmatrix},$$

the first vector $$b = \frac{1}{2}\begin{bmatrix} \|\underline{a}_1\|^2 - d_1^2 \\ \vdots \\ \|\underline{a}_m\|^2 - d_m^2 \end{bmatrix},$$

the second vector $y=[\|\underline{x}\|, \underline{x}^T]^T$, i is a positive integer, and i=1, m, $\underline{x}$ is a coordinate vector of the target device, and a number of the devices in the measurement device array equals m+1;
identifying a condition set, the condition set comprising: a first condition $(A^TA+\lambda D)y=A^Tb$ and a second condition $v^T(A^TA+\lambda D)v \geq 0$ for all third vectors (v) satisfying $v^TDv \leq 0$, wherein a second matrix $$D = \begin{bmatrix} 1 & 0_{1 \times n} \\ 0_{n \times 1} & -I_n \end{bmatrix}$$

and $\lambda$ is a Lagrange multiplier;
determining whether the second vector (y) satisfies the condition set;
generating a numerical approximation of an optimal solution of the second vector (y) based on a result of determining whether the second vector (y) satisfies the condition set; and
localizing the target device according to the numerical approximation of the optimal solution.

16. A non-transitory computer-readable medium storing instructions that are operable when executed by data-processing apparatus to perform operations comprising:
obtaining range difference values ($d_i$) and coordinate vectors ($\underline{a}_i$) of devices in the measurement device array, wherein the range difference values are generated based on time difference of arrival measurements of wireless signals between the target device and each of the devices in the measurement device array;
constructing a first matrix (A), a first vector (b), and a second vector (y), the first matrix (A) and the first vector (b) each comprising the range difference values and the coordinate vectors, wherein the first matrix $$A = \begin{bmatrix} d_1 & \underline{a}_1^T \\ \vdots & \vdots \\ d_m & \underline{a}_m^T \end{bmatrix},$$

the first vector $$b = \frac{1}{2}\begin{bmatrix} \|a_1\|^2 - d_1^2 \\ \vdots \\ \|a_m\|^2 - d_m^2 \end{bmatrix},$$

the second vector $y=[\|\underline{x}\|, \underline{x}^T]^T$, i is a positive integer and i=1, m, $\underline{x}$ is a coordinate vector of the target device, and a number of the devices in the measurement device array equals m+1;
    identifying a condition set, the condition set comprising:
        a first condition $(A^TA+\lambda D)y=A^Tb$ and a second condition $V^T(A^TA+\lambda D)v \geq 0$ for all third vectors (v) satisfying $v^TDv \leq 0$, wherein a second matrix $$D = \begin{bmatrix} 1 & 0_{1 \times n} \\ 0_{n \times 1} & -I_n \end{bmatrix}$$

and $\lambda$ is a Lagrange multiplier;
    determining whether the second vector (y) satisfies the condition set;
    generating a numerical approximation of an optimal solution of the second vector (y) based on a result of determining whether the second vector (y) satisfies the condition set; and
    localizing the target device according to the numerical approximation of the optimal solution.

\* \* \* \* \*